G. C. MURRAY.
DRAFT GEAR ATTACHMENT.
APPLICATION FILED AUG. 23, 1915.
1,224,312.
Patented May 1, 1917.
2 SHEETS—SHEET 2.
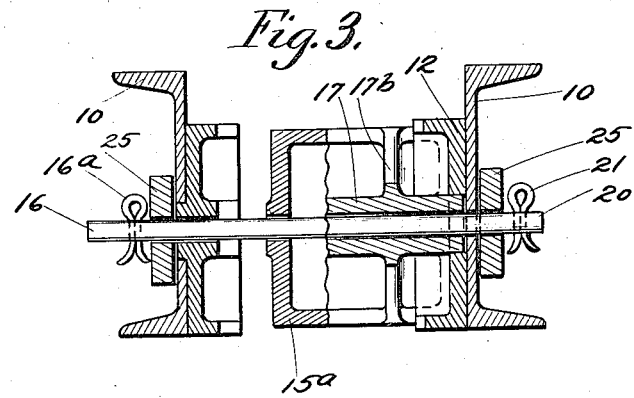
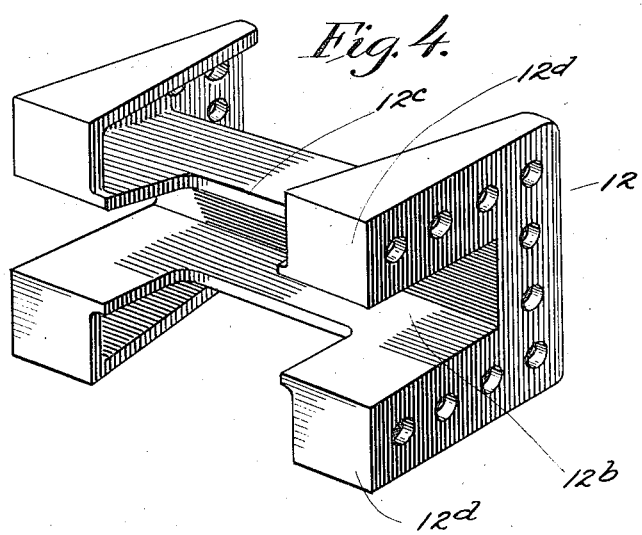
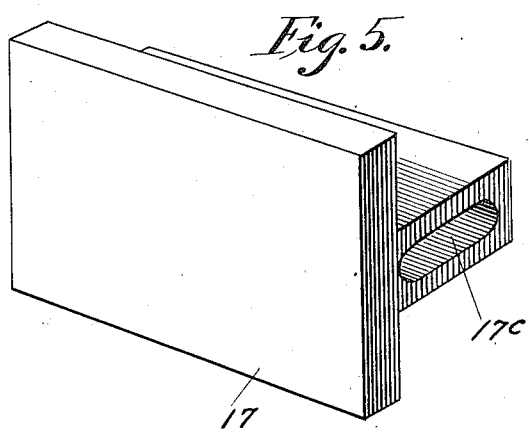
Witness:
C. E. Burnap
Inventor:
George C. Murray
By Sheridan, Wilkinson & Scott, Att'ys

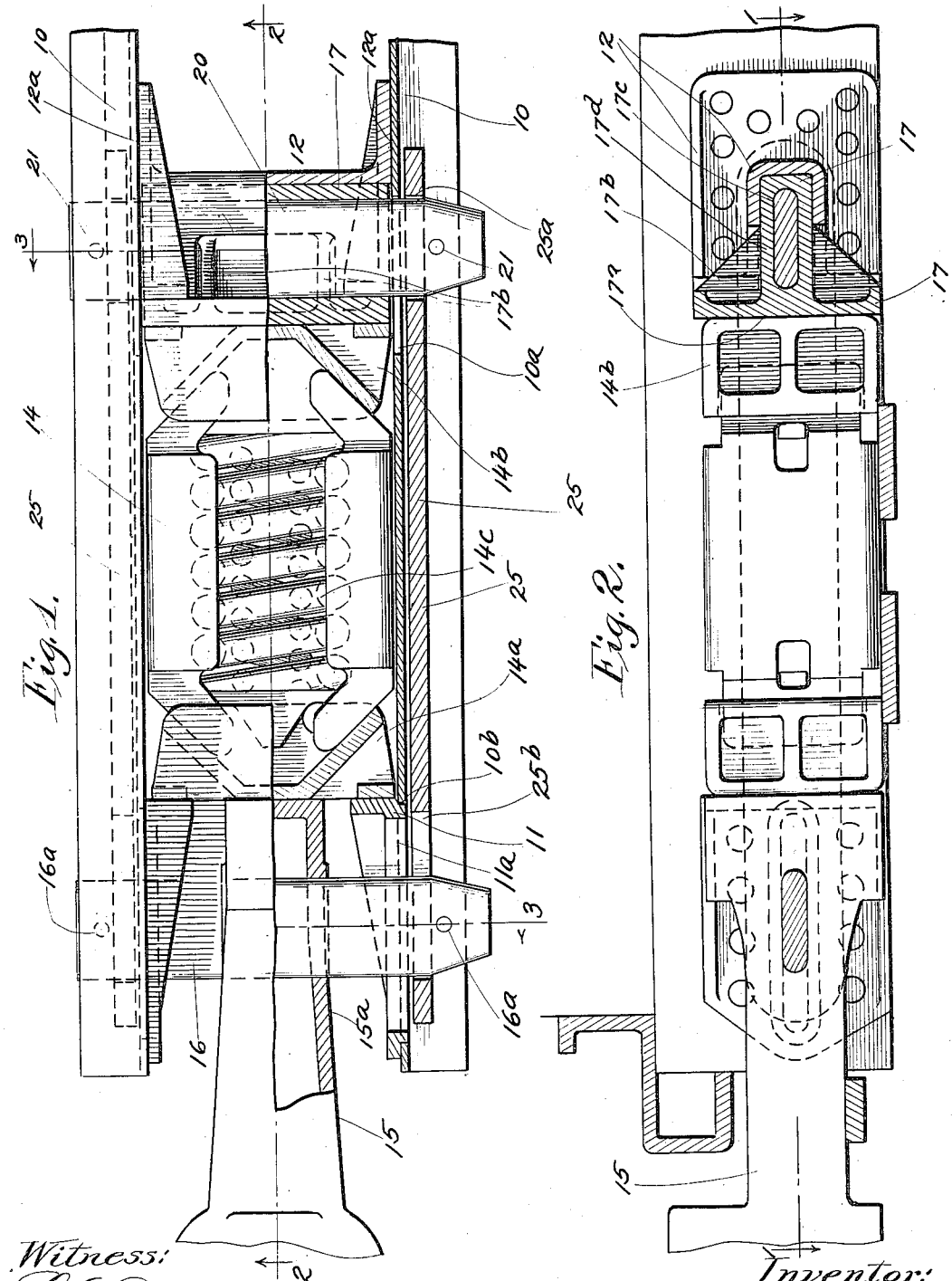

UNITED STATES PATENT OFFICE.

GEORGE C. MURRAY, OF CHICAGO, ILLINOIS.

DRAFT-GEAR ATTACHMENT.

1,224,312.      Specification of Letters Patent.      Patented May 1, 1917.

Application filed August 23, 1915. Serial No. 46,879.

*To all whom it may concern:*

Be it known that I, GEORGE C. MURRAY, a citizen of the United States, residing at Chicago, in the county of Cook and State of Illinois, have invented certain new and useful Improvements in Draft-Gear Attachments, of which the following is a specification.

This invention relates to improvements in draft gear attachments, and has for its object to provide an attachment, or harness, for draft gear or draft rigging by which I am enabled to eliminate the yoke ordinarily used and to increase the strength of the rigging, as well as the ease of assembling and disassembling, and at the same time reduce the cost of manufacture and construction.

Still another object of my invention is to provide such a construction in which it is possible to provide a gear substantially filling the space between the draft sills, and at the same time providing means for tying and securely fastening the sills to each other. These and other objects will be set forth and made apparent in the following specification and shown in the accompanying drawings, in which,—

Figure 1 is a plan view, partially in section, of my improved invention;

Fig. 2 is a vertical longitudinal section of same;

Fig. 3 is a transverse section along the line 3—3 of Fig. 1;

Fig. 4 is a perspective of the sill-tying block member; and

Fig. 5 is a perspective of my improved follower member.

Like numerals refer to like elements throughout the drawings, in which 10 indicates draft sills between which is mounted the draft rigging. The draft sills are slotted at $10^a$ and $10^b$, at the back and front of the draft rigging also, and draft lugs 11 are secured thereto at the front of said rigging, the draft lugs being also slotted at $11^a$, as shown in Fig. 1 for example. Rearwardly of the draft lugs 11 and extending between the draft sills 10 is what I term my sill-tying block 12, shown in perspective in Fig. 4. This block is riveted, or otherwise secured, at its sides $12^a$ to the draft sills 10, and is provided with the transverse seat or recess $12^b$, the top and bottom of which are cut away at $12^c$, as clearly shown in Fig. 4. The forwardly-facing portions $12^d$ of the block 12 constitute the rear draft lugs of the combination, as will be apparent from the inspection of same. Between the front draft lugs 11 and the rear blocks $12^a$ I have shown a draft rigging generally indicated by the numeral 14, the same being similar generally to that shown for example in my Patent No. 927,810, patented July 13, 1909. It is not necessary to describe this draft rigging herein, and I also wish it understood that any similarly functioning draft rigging may be used in place thereof, in the combination described herein. It is only necessary to state here that the draft rigging 14 comprises among other elements front and back followers $14^a$ and $14^b$, acting indirectly against the coil springs $14^c$, which resist buffing or pulling shocks.

15 indicates the coupler having the coupler butt $15^a$ slotted to permit insertion therethrough of the transverse key 16, which projects outwardly at each end through slots $11^a$ and $10^b$ of the forward draft lugs and draft sills, respectively; see Fig. 1. The key 16 is provided with cotter-pins $16^a$, or the like, adjacent its outer ends, to prevent accidental displacement thereof. At the rear end of the draft rigging is provided a follower block 17 constructed with a front face $17^a$ and a rearwardly-extending stock $17^b$, apertured at $17^c$ and adapted to closely seat in the seat or recess $12^b$, or tie-block 12, when in normal position, as shown in Fig. 2. Strengthening or reinforcing ribs $17^d$ extend between and are formed integral with the face portion $17^a$ of the stock $17^b$ of the follower block 17. The front face portion $17^a$ of this follower block 17 abuts against the rear follower $14^b$ and constitutes in itself a follower member, as will be set forth in full hereinafter. A transverse key 20 extends through and closely fits in the aperture $17^c$ of the follower 17, projecting at its ends therebeyond and extending through the slots $10^a$ in the draft sills 10. As is the case with the key 16, cotter pins 21 are passed through the key 20 adjacent its ends, to prevent its accidental displacement or removal. Located outside of the draft sills 10 and extending between the keys 16 and 20 are the links 25. These links are slotted at $25^a$ and at the rear ends to fit over the key 20, and are provided with elongated slots $25^b$ at their forward ends to fit over the key 16. These forward slots $25^b$ when in position shown in Fig. 1, extend rearwardly slightly beyond the slots $11^a$ of the draft lugs 11, as is shown in Fig. 1. The arrangement of these links 25 is such that when the coupler 15 is drawn forwardly under a pulling strain or shock, tension is transmitted thereby to the cross-key 20, and the draft rigging 14 is compressed to resist such shock, as will be apparent. Through the medium of the follower member 17 coacting with the follower 14$^b$, under buffing shocks the coupler pin 15$^a$ will force the follower 14$^a$ rearwardly against the action of the coil springs, which in turn are resisted by the followers 14$^b$ and 17, the latter being held by the tie-block 12 against rearward movement. The slots 25$^b$ and the links 25 permit the key 17 to move rearwardly with the coupler butt 15$^a$, without exerting any strain or compression upon the links 25, the latter being used only for pulling stresses. These slots 25$^b$, as stated above, extend rearwardly of the slots 11$^a$ a slight distance to insure non-compression of the links under rearward movement of the key 16.

It will be apparent that my invention is susceptible of a number of modifications and improvements, and I do not wish to be restricted to the form shown or described beyond the scope of the appended claims.

What I claim is:—

1. In combination, draft sills, draft rigging located therebetween, a key extending through said sills at the rear of said rigging, and a follower member between said rigging and said key, said follower member being cross-apertured, said key extending through said aperture, a tie member extending between said draft sills and secured thereto, said member being provided with a seat, said follower member seating in said seat when in rest position.

2. In combination, draft sills, slotted draft lugs secured to said draft sills, a key extending through the slots in said lugs and said sills, a coupler abutting said key being carried thereby, a cross-member extending between and secured to said sills, a second key extending through said sills adjacent said cross-member, draft rigging located between said sills and said lugs and cross-member, said rigging comprising a follower normally abutting against said draft lugs, a second follower normally abutting against said cross-member, and links located outwardly of said draft sills and extending between said keys.

3. In combination, draft sills, slotted draft lugs secured to said draft sills, a key extending through the slots in said lugs and said sills, a coupler abutting said key being carried thereby, a cross-member extending between and secured to said sills, a second key extending through said sills adjacent said cross-member, draft rigging located between said sills and said lugs and cross-member, said rigging comprising a follower normally abutting against said draft lugs, a second follower normally abutting against said cross-member, and links located outwardly of said draft sills and extending between said keys, said second follower being apertured, said second key extending through and being seated in said aperture.

In testimony whereof, I have subscribed my name.

GEORGE C. MURRAY.